United States Patent Office 3,475,362
Patented Oct. 28, 1969

3,475,362
RUBBER ADHESIVES
John F. Romanick, Irvington, and Arthur B. Pruiksma, Paterson, N.J., assignors to PPG Industries, Inc., Pittsburgh, Pa., a corporation of Pennsylvania
No Drawing. Continuation-in-part of applications Ser. No. 579,003, and Ser. No. 578,972, Sept. 13, 1966. This application May 7, 1968, Ser. No. 727,317
Int. Cl. C08d 9/10
U.S. Cl. 260—25    17 Claims

ABSTRACT OF THE DISCLOSURE

Rubber based adhesive compositions of improved properties comprise a carboxyl-containing rubbery addition polymer, a metal contained in an organometallic resin and a solubilizing resin. A non-carboxyl containing rubbery polymer can also be included. Compositions containing the adhesive thus obtained have better cohesive strength and heat resistance as reflected by a lowered tendency to creep under stress at elevated temperatures. When used in a mastic adhesive composition, they have low "nerve" and are easily applied by trowelling.

---

This application is a continuation-in-part of copending applications Ser. No. 579,003 and Ser. No. 578,972, both filed on Sept. 13, 1966 and now abandoned.

Rubber-based adhesives in which a rubbery addition polymer is combined with one or more other resinous materials have been extensively used for the bonding of various materials. While such adhesives are quite useful and can be used for many purposes they have for the most part certain shortcomings which preclude their use in many applications. These include, for example, certain deficiencies in cohesive strength and heat resistance. Among the applications for such compositions is their use as mastic adhesives, which are high viscosity materials employed in adhering floor and wall tile, floor coverings, wallboard and panelling, and for similar uses. Mastic adhesives are generaly applied using a notched trowel and one of the problems encountered, particularly when good adhesive performance is required, is the tendency of the adhesive to "string" and stick to the trowel. Other disadvantages of many mastic adhesives include certain deficiencies in cohesive strength and heat resistance, and a resistance to flow, known as "nerve," which makes them difficult to apply.

It has been discovered that adhesives comprising a carboxyl-containing rubbery addition polymer, a metal contained in an organometallic resin, and a solubilizing resin providing outstanding application and performance properties. Among the improved properties of these adhesives are better cohesive strength and heat resistance as reflected by a lowered tendency to creep under stress at elevated temperatures. The improved properties of these adhesives permit them to be used, for instance, in application of insulation, automotive interiors such as headliners, and other applications involving the bonding of metal, cloth, plastics, fiber glass and the like, where resistance to elevated temperatures is required.

It has further been discovered that mastic adhesives comprising a rubbery addition polymer, an organometallic compound, and a thermoplastic solubilizing resin, where all or part of the rubbery polymer contains carboxyl groups, provide outstanding application and performance properties. For instance, these mastics are characterized by low "nerve" and can be easily applied by trowelling without "stringing" of the adhesive and without excessive sticking of the adhesive to the trowel.

The carboxyl-containing rubbery addition polymers employed are one or more polymers of one or more olefinically unsaturated compounds, all or part of which are modified to contain carboxyl groups in the polymer chain. The polymer or polymers should have an average molecular weight of at least about 30,000 (as determined by osmometry) and should contain a total of from about 0.005 to about 0.12 molar equivalent of carboxyl (—COOH) per 100 grams of polymer. In the case of mastic adhesives the polymer or polymers should contain a total of from about 0.00025 to about 0.12 equivalent of carboxyl per 100 grams.

Usually, these rubbery polymers contain a major proportion of diene, with the preferred diene being 1,3-butadiene. Other dienes which are utilized include isoprene, 2,3-dimethyl-1,3-butadiene, 2-neopentyl-1,3-butadiene, 2-chloro-1,3-butadiene, 1-cyano1,3-butadiene, piperyline, straight and branched chain hexadienes and others.

The preferred dienes are open-chain aliphatic dienes, usually having from 4 to 6 carbon atoms; dienes containing more than 10 carbon atoms are less desirable since they are difficult to polymerize.

Rubbery polymers not made from dienes can also be employed, such as polyisobutylene rubbers.

The carboxyl-containing polymer can be a carboxylated homopolymer, such as carboxylated polybutadiene, or it can be a carboxylated copolymer of a diene with one or more other comonomers in minor proportions. Styrene is a preferred comonomer and carboxylated butadiene-styrene copolymers are the preferred rubbery polymers for use in the invention. Similar copolymers can be made using unsaturated nitriles, such as acrylonitrile, or other comonomers, such as 2-vinyl pyridine and the like.

Various methods are used to introduce carboxyl groups into the polymer. For example, there may be included in the copolymer a copolymerizable monomer which can be hydrolyzed to provide an acidic carboxyl group. Such hydrolyzable comonomers can be, for instance, an alkyl acrylate or methacrylate, or an unsaturated acid chloride, amide or nitrile. When a copolymer of a nitrile such as acrylonitrile is used to make the rubbery polymer, part of the nitrile groups can be hydrolyzed to provide the acidic carboxyl groups desired.

The preferred carboxyl-containing polymers are those in which an ethylenically unsaturated carboxylic acid copolymerizable with the diene (or other unsaturated monomer) and any other comonomer is included in the polymer to produce directly a carboxyl-containing addition polymer. Examples of acids useful in producing carboxyl-containing rubbery polymers include acrylic acid, methacrylic acid, ethacrylic acid, alphachloroacrylic acid, crotonic acid, maleic acid, fumaric acid, 2,4-pentadiendioic-1,3 acid, sorbic acid and other monocarboxylic and polycarboxylic acids containing one or more ethylenic groups and which can be copolymerized with the other monomer or monomers employed.

The proportions and procedures utilized to provide rubbery polymers as described are well-known; carboxyl-containing polymers are described, for example, in U.S. Patents 2,880,186 and 3,100,160. Various carboxyl-containing rubbery addition polymers of the type used herein are available commercially and these are preferably utilized in the invention.

In the case of mastic adhesives, it is ofen preferred to utilize a mixture of carboxyl-containing rubbery polymer and non-carboxylated rubbery polymer. In such cases, the rubbery polymer component is comprised of about 5 to about 70 percent by weight and preferably about 10 to about 40 percent by weight, of carboxyl-containing polymer, the remainder (30 to 95 percent and preferably 60 to 90 percent) being rubbery polymer devoid of carboxyl groups. The carboxylated and non-carboxylated polymers can be the same (except for the carboxyl modification) or they can be different, although they should be compatible. The carboxyl-containing polymer employed usually contains from about 0.005 to about 0.12 carboxyl equivalent per 100 grams of polymer, so that in this embodiment the total carboxyl functionality of the rubbery polymer component (including both carboxylated and non-carboxylated polymers) is between about 0.00025 and about 0.084 carboxyl equivalent per 100 grams of rubbery polymer.

The metallic component of the adhesive compositions of the invention is an organic solvent-soluble resinous organometallic compound which contains a metal from Groups I–A, II–A, II–B, or IV–A of the Periodic Table. (The Periodic Table referred to herein is the conventional table as found, for instance, at pages 394 and 395 of the "Handbook of Chemistry and Physics," 38th edition, published by the Chemical Rubber Publishing Company.) The carboxyl groups in the rubbery polymer and the metal in the organometallic resin are coreactive and provide many of the desirable properties, particularly cohesive strength and heat resistance. The function of the organic portion of the organometallic compound is to provide the metal in soluble reactive form, and thus the specific nature of the organic portion of these compounds is not critical, provided that it is sufficiently soluble and compatible with the other components.

Ordinarily, the organometallic resin is made by reacting an oxide or hydroxide of the metal with a resinous material containing carboxyl groups, methylol groups or other sites reactive with the metal oxide or hydroxide. One class of such organometallic compounds are metal resinates, such as zinc rosinate, magnesium rosinate and the like. These are made by reacting the metal oxide or hydroxide with resin or a rosin derivative, such as a partial ester of rosin or a rosin-phenol reaction product. Other especially useful reactive resins are heat-hardenable, oil soluble phenol-aldehyde resins. Such phenol-aldehyde resins contain methylol groups and are usually made by reacting a para-substituted phenol, such as para-tertiary butyl phenol, with an excess of formaldehyde using an alkaline catalyst. Other phenols and aldehydes, as well as other procedures, can also be employed to produce useful reactive phenolic resins.

Still other resins which can be used include hydrocarbon resins containing carboxyl or hydroxyl groups, and the like.

Among the metals which can be employed in the organometallic resins used in the adhesives herein are lithium, sodium, magnesium, barium, calcium, zinc, and lead.

Zinc rosinate is especially desirable, and magnesium-phenolics and zinc-phenolics also give good results. With resins containing certain of the more reactive of the above metals, such as barium, calcium and lead, care should be taken to avoid gelation, and these metals are best employed in small amounts or in combination with other metals such as zinc.

The amount of organometallic compound employed should be sufficient to provide from about 0.1 to about 80 parts by weight of the metal for each 100 parts of carboxyl-containing rubbery addition polymer utilized. Generally, this means that from about 5 to about 150 parts of organometallic resin (or ordinary metal content) are used for each 100 parts of carboxyl-containing rubbery polymer.

The other component of the adhesive herein is a solubilizing resin, which aids in obtaining a stable, homogeneous adhesive. There can be employed for this purpose essentially any resin which is soluble in the solvent employed and which is compatible with the other ingredients, i.e., which forms a homogeneous solution when mixed with the other components.

A number of such resins are available, including rosin and rosin derivatives, such as glycerol, glycol or pentaerythritol esters of rosin, hydrogenated rosin or disproportioned rosin; polyterpenes, such as polymerized beta-pinene; hydrocarbon resins, such as polymers of cyclopentadiene and polymerized petroleum fractions; chlorinated aromatic hydrocarbon resins, such as chlorinated polyphenyl and resinous chlorinated biphenyl; terpene-phenol resins, such as the products made from alpha-terpinene and phenol or reaction products of a phenol-aldehyde resin with a rosin-phenol resin; coumarone-indene resins, such as the resinous product of polymerized coal tar light oils; polystyrenes, such as polymerized alpha-methylstyrene; and oil-soluble phenol-aldehyde resins, both heat-hardening and non-heat hardening.

While it is ordinarily necessary that some amount of solubilizing resin be present in the adhesive composition, the amount is not critical and the maximum amount that can be utilized in any composition depends upon the other components and the properties which are desired. From about 50 to about 450 parts by weight of the solubilizing resin are ordinarily employed for each 100 parts of rubbery polymer present.

It should be noted that all or part of the solubilizing resin utilized can be added along with or as part of the organometallic resin. Thus, in some cases no added solubilizing resin need be added. It is only necessary that the above proportion of metal be included and that a total of about 50 to about 450 parts of solubilizing resin be present, including that which is part of the organometallic resin.

The adhesives herein are often employed in liquid form, being contained in the organic solvent medium which can be essentially any solvent or solvent mixture in which the components of the adhesive can be dissolved or dispersed to give a stable, homogeneous composition. Among the solvents which can be included in the solvent or solvent mixture are various hydrocarbons, including aliphatic, cyclic and aromatic hydrocarbons and chlorinated hydrocarbons, as well as ketones, esters, alcohols and other liquid solvents. Specific solvents that can be employed include hexane, heptane, cyclohexane, toluene, benzene, chlorobenzene, 1,1,1-trichloroethane, methylene chloride, ethylene dichloride, methylethyl ketone, ethyl acetate, amyl acetate, ethanol, and the like.

The choice of solvents depends largely upon the adhesive components and especially the rubbery polymer. For instance, when carboxylated styrene-butadiene rubbers are utilized aliphatic solvents are preferred.

The mastic adhesives herein are of high viscosity; their viscosity is usually above 50,000 centipoises and can be up to several million centipoises. They contain a high proportion of solids, ordinarily about 50 to about 90 percent. The remainder is organic solvent which can be essentially any solvent or solvent mixture in which the components of the adhesive can be dissolved or dispersed to give a stable, homogeneous composition, as described above.

The adhesives herein are made simply by mixing and blending the various components specified above, along with any other additives such as antioxidants, acid acceptors, stabilizers, etc. Fillers such as calcium carbonate or talc are often added to give desired consistency, especially in producing mastic adhesives. The rubbery polymer is usually milled to aid in dissolving it. The various ingredients can be added in any order, and the solvent can be added along with the other components, if desired.

As mentioned, the mastic adhesives of the invention in many instances contain a mixture carboxylated and non-carboxylated rubbers. In the case of liquid adhesives, optimum results for many purposes are attained using carboxyl-containing polymer as the sole rubbery addition polymer; however, liquid adhesives of desirable properties are also provided by utilizing a rubbery polymer devoid of carboxyl groups in place of part of the carboxylated rubber. Even when as much as 90 percent of the rubbery polymer is non-carboxyl containing, the compositions obtained have improved properties such as heat resistance over corresponding adhesives not containing carboxylated polymer. The non-carboxylated polymer employed can be made from the same monomers or from different monomers as is the carboxylated polymer, and can be made from any of the above dienes and other monomers. As in the case of carboxyl-containing polymer, polymers of butadiene are preferred, such as polybutadiene and copolymers of butadiene with minor proportion of styrene or acrylonitrile.

Set forth below are several examples of the invention, which illustrate the adhesive compositions as described above. All parts and parts and percentages in the examples (and throughout this specification) are by weight unless otherwise indicated.

EXAMPLE 1

In this example there was employed a carboxyl-containing butadiene-styrene rubber having an average molecular weight of 55,000–70,000 (determined by osmometry) and containing interpolymerized methacrylic acid in an amount corresponding to about 0.03 molar equivalent of bound acid (—COOH) per 100 grams of rubber. It was made in accordance with U.S. 2,880,186. The organometallic resin used was a commercial zinc rosinate containing 8.9 percent zinc and 0.6 percent calcium.

A mixture of 100 parts of the carboxyl-containing rubber with 2 parts of 2,2-methylenebis (4-ethyl-6-t-butylphenol) and 1 part of triphenyl phosphite (antioxidants) was milled on a rubber mill for 12 minutes at room temperature. This mill stock was then formulated into an adhesive by thoroughly mixing the following in a churn:

| | Parts by wt. |
|---|---|
| Mill stock above | 103 |
| Zinc rosinate | 80 |
| Alpha-pinene resin (softening point, ring and ball, 135° C.) | 60 |
| Ethanol | 25 |
| Hexane | 665 |

The adhesive obtained was stable and homogeneous and had excellent properties. For example, its heat resistance was measured by a shear test in which canvas is bonded to enamelled steel with a 1 inch square overlap area, and then subjected to a constant 1 pound load while increasing the temperature at a rate of 15° F. per 20 minutes. The temperature at which the assembly fails is taken as a measure of its heat resistance, and in this case was 235° F. By way of comparison, such an assembly using adhesive made with conventional non-carboxylated styrene-butadiene rubber failed at a temperature of 155° F.

EXAMPLE 2

Example 1 was repeated except that the organometallic resin employed was a lithium-phenolic made by mixing the following for 5 days at room temperature followed by drying in a vacuum oven at 150° F.:

| | Parts by wt. |
|---|---|
| Lithium hydroxide | 8 |
| Phenol-aldehyde resin (from the alkaline catalyzed reaction of t-butylphenol with excess formaldehyde) | 100 |
| Water | 2 |
| Hexane | 112 |

The adhesive obtained again had excellent properties.

EXAMPLE 3

Example 1 was repeated using a sodium-phenolic organometallic resin made as in Example 2 but using 14 parts of sodium hydroxide and 16 parts of water. In this case the adhesive was made using a high speed, high shear mixer instead of a churn. The adhesive obtained again had desirable properties.

EXAMPLE 4

In this example a mixture of carboxyl-containing polymer and non-carboxyl containing polymer was utilized. Example 1 was repeated except that 75 parts of the carboxyl-containing rubbery polymer (as in Example 1) were used along with 25 parts of a non-carboxyl containing copolymer of 76.5 percent butadiene and 23.5 percent styrene (SBR1022). In the heat resistance test described above, a temperature of 210° F. was reached before the assembly failed.

Liquid adhesives of the class described with good properties were also made by employing various other carboxyl-containing rubbers as all or part of the carboxyl-containing rubber component of the above examples. For instance, there can be employed carboxylated polybutadiene having a carboxyl content of about 0.05 equivalent per 100 grams of rubber, or a butadiene-acrylonitrile copolymer rubber containing 0.078 carboxyl equivalent per 100 grams. Also other solubilizing resins, organometallic resins, solvents and additives can be employed.

EXAMPLE 5

In this example a mixture of a carboxylated rubber and a non-carboxylated rubber were employed to produce a mastic adhesive. The carboxylated rubber was a butadiene-styrene rubber, made in accordance with U.S. 2,880,186, having an average molecular weight of 55,000–70,000 (determined by osmometry) and containing interpolymerized methacrylic acid in an amount corresponding to about 0.03 molar equivalent of bound acid (—COOH) per 100 grams of polymer. The noncarboxylated rubber was a copolymer of 76.5 percent butadiene and 23.5 percent styrene (SBR1011). The organometallic resin was zinc rosinate containing 5.6 percent combined zinc and 1.8 percent combined calcium.

The following were milled for 10 minutes on a rubber mill:

| | Parts by wt. |
|---|---|
| Carboxylated rubber | 10 |
| Non-carboxylated rubber | 90 |
| 2,2'-methylenebis (4-ethyl-6-t-butylphenol) | 2 |
| Triphenyl phosphite | 1 |

This mill stock was then formulated into an adhesive by mixing the following on a heavy duty kneading mixer:

| | Parts by wt. |
|---|---|
| Mill stock | 103 |
| Zinc rosinate | 20 |
| Beta-pinene resin (softening point 115° C.) | 100 |
| Ethylene glycol ester of polymerized rosin | 50 |
| Calcium carbonate | 375 |
| Talc | 109 |
| Asbestos | 107 |
| Hexane | 250 |

The adhesive obtained had a total non-volatile solids content of 77 percent and its viscosity was 240,000 centipoises at 25° C. It was a soft, gelled mastic, easily applied by trowelling, without stringing. By contrast, corresponding adhesives made with 100 parts of the non-carboxylated rubber or omitting the zinc rosinate are difficult to apply and string badly when trowelled.

Other mastic adhesives of desirable properties are produced in the foregoing manner by substituting various other carboxyl-containing polymers for that employed above. For instance, there can be used a carboxylated butadiene-acrylonitrile copolymer rubber containing about 0.078 carboxyl equivalent per 100 grams of rubber, or a carboxylated polybutadiene containing about 0.05 carboxyl equivalent per 100 grams. Similarly, other non-carboxyl containing rubbers can be used, such as butadiene-acrylonitrile rubber, polybutadiene rubber and others, or the rubbery polymer component can be composed entirely of carboxyl-containing rubber.

Similarly, other organometallic resins can be substituted for the zinc rosinate above, including, for example, magnesium rosinate and calcium rosinate, and lead-phenolic resin, sodium-phenolic resin, lithium-phenolic resin and magnesium-phenolic resins. These metal-phenolic resins can be made by reacting the metal oxide or hydroxide with an oil-soluble, heat-hardening phenol-aldehyde resin in the presence of a small amount of water. A preferred phenolic resin for this purpose is made from the alkaline-catalyzed reaction of p-t-butylphenol with excess formaldehyde.

According to the provisions of the patent statutes, there are described above the invention and what are now considered to be its best embodiments. However, within the scope of the appended claims, it is to be understood that the invention can be practiced otherwise than as specifically described.

We claim:
1. An adhesive composition in organic solvent, said composition consisting essentially of
  (1) 100 parts by weight of addition polymer selected from the group consisting of rubbery polymers containing a major proportion of diene and polyisobutylene rubbers, said addition polymer having an average molecular weight of at least about 30,000 and containing from about 0.005 to about 0.12 carboxyl equivalent per 100 grams of rubbery polymer;
  (2) from about 0.1 to about 80 parts by weight of a metal in Groups I–A, II–A, II–B, or IV–A of the Periodic Table, the metal being contained in an organic solvent-soluble organometallic resin and being coreactive with the carboxyl groups in said addition polymer; and
  (3) a total of from about 50 to about 450 parts by weight of solubilizing resin soluble in said organic solvent and compatible with said addition polymer.
2. The composition of claim 1 in which said addition polymer is an interpolymer of diene and ethylenically unsaturated carboxylic acid.
3. The composition of claim 1 in which said organometallic resin is formed by the reaction of an oxide or hydroxide of said metal with an organic resin having carboxyl or methylol groups.
4. The composition of claim 3 in which said organic resin is rosin.
5. The composition of claim 3 in which said organic resin is an oil-soluble, heat-hardenable phenol-aldehyde resin.
6. The composition of claim 1 in which said rubbery polymer is a carboxylated polymer of butadiene.
7. The composition of claim 1 in which said rubbery polymer is a carboxylated copolymer of butadiene with a minor proportion of styrene.
8. The composition of claim 6 in which the organometallic resin is zinc rosinate.
9. The adhesive of claim 1 in which said organic solvent comprises at least a majojr proportion of aliphatic hydrocarbon.
10. An adhesive compositon in organic solvent, said composition consisting essentially of
  (1) 100 parts by weight of addition polymer selected from the group consisting of rubbery polymers containing a major proportion of diene and polyisobutylene rubbers, said addition polymer having an average molecular weight of at least about 30,000 and consisting of
    (a) carboxyl-containing addition polymer containing from about 0.005 to about 0.12 carboxyl equivalent per 100 grams of polymer, and
    (b) from 0 to about 90 percent by weight of rubbery addition polymer devoid of carboxyl groups;
  (2) from about 0.1 to about 80 parts by weight of a metal in Groups I–A, II–A, II–B, or IV–A of the Periodic Table, the metal being contained in an organic solvent-soluble organometallic resin and being coreactive with the carboxyl groups in said addition polymer; and
  (3) a total of from about 50 to about 450 parts by weight of solubilizing resin soluble in said organic solvent and compatible with said addition polymer.
11. The composition of claim 10 in which said rubbery addition polymers are copolymers of butadiene with a minor proportion of styrene.
12. The composition of claim 11 in which the organometallic resin is zinc rosinate.
13. A high viscosity mastic adhesive composition in organic solvent, said composition consisting essentially of
  (1) 100 parts by weight of one or more addition polymers selected from the group consisting of rubbery polymers containing a major proportion of diene and polyisobutylene rubbers, said addition polymers having an average molecular weight of at least about 30,000 and containing a total of from about 0.00025 to about 0.12 carboxyl equivalent per 100 grams of rubbery polymer;
  (2) from about 0.1 to about 80 parts by weight of a metal in Groups I–A, II–A, II–B, or IV–A of the Periodic Table, the metal being contained in an organic solvent-soluble organometallic resin and being coreactive with the carboxyl groups in said addition polymer; and
  (3) a total of from about 50 to about 450 parts by weight of solubilizing resin soluble in said organic solvent and compatible with said addition polymer.
14. The composition of claim 13 in which said organometallic resin is formed from the reaction of an oxide or hydroxide of said metal with an organic resin having free carboxyl or methylol groups.
15. The composition of claim 13 in which said rubbery polymer is a copolymer of butadiene with a minor proportion of styrene.
16. The composition of claim 15 in which the organomeallic resin is zinc rosinate.
17. A high viscosity mastic adhesive composition in organic solvent, said composition consisting essentially of
  (1) 100 parts by weight of addition polymer selected from the group consisting of rubbery polymers containing a major proportion of diene and polyisobutylene rubbers, said addition polymer having an average molecular weight of at least about 30,000 and consisting of
    (a) carboxyl-containing rubbery addition polymer, and
    (b) from 30 to about 95 percent by weight of addition polymer devoid of carboxyl groups, said addition polymer containing a total of from about 0.00025 to about 0.084 carboxyl equivalent per 100 grams;
  (2) from about 0.1 to about 80 parts by weight of a metal in Groups I–A, II–A, II–B, or IV–A of the Periodic Table, the metal being contained in an organic solvent-soluble organometallic resin and being coreactive with the carboxyl groups in said addition polymer; and

(3) a total of from about 50 to about 450 parts by weight of solubilizing resin soluble in said organic solvent and compatible with said addition polymer.

References Cited

UNITED STATES PATENTS

| | | | |
|---|---|---|---|
| 3,008,912 | 11/1961 | Morris et al. | 260—31.2 |
| 3,044,976 | 7/1962 | Brooks et al. | 260—32.8 |
| 3,100,160 | 8/1963 | Korpman | 117—122 |

OTHER REFERENCES

Skeist I: "Handbook of Adhesives," 1962, tp 968 S5 C.2, 1 copy in group 1401, 1 ppl. 255 to 260 relied on.

DONALD E. CZAJA, Primary Examiner
WILLIAM E. PARKER, Assistant Examiner

U.S. Cl. X.R.

260—27, 31.2, 32.8, 33.4, 33.6, 33.8, 38, 44.5, 845